United States Patent
Kovach

(10) Patent No.: US 10,412,875 B2
(45) Date of Patent: Sep. 17, 2019

(54) SHANK ASSEMBLY FOR AN AGRICULTURAL IMPLEMENT WITH ADJUSTABLE BIASING FORCES AND RELATED METHODS

(71) Applicant: CNH Industrial America, LLC, New Holland, PA (US)

(72) Inventor: Michael G. Kovach, Morton, IL (US)

(73) Assignee: CNH Industrial America LLC, New Holland, PA (US)

( * ) Notice: Subject to any disclaimer, the term of this patent is extended or adjusted under 35 U.S.C. 154(b) by 96 days.

(21) Appl. No.: 15/586,372

(22) Filed: May 4, 2017

(65) Prior Publication Data
US 2018/0317370 A1 Nov. 8, 2018

(51) Int. Cl.
| | |
|---|---|
| A01B 63/00 | (2006.01) |
| A01B 23/02 | (2006.01) |
| A01B 35/24 | (2006.01) |
| A01B 61/04 | (2006.01) |
| A01B 15/20 | (2006.01) |
| A01B 63/24 | (2006.01) |

(52) U.S. Cl.
CPC .......... *A01B 63/008* (2013.01); *A01B 15/20* (2013.01); *A01B 23/02* (2013.01); *A01B 35/24* (2013.01); *A01B 61/04* (2013.01); *A01B 63/24* (2013.01)

(58) Field of Classification Search
CPC ...... A01B 61/046; A01B 35/24; A01B 63/008
USPC ................................................ 172/705, 265
See application file for complete search history.

(56) References Cited

U.S. PATENT DOCUMENTS

| | | | |
|---|---|---|---|
| 631,232 A | 8/1899 | Sobey | |
| 1,004,224 A | 9/1911 | Willis | |
| 2,935,148 A * | 5/1960 | Graham | ................ A01B 35/24 |
| | | | 172/710 |

(Continued)

FOREIGN PATENT DOCUMENTS

| | | |
|---|---|---|
| AU | 676503 B2 | 3/1997 |
| EP | 2656708 A1 | 10/2013 |
| WO | WO 2016185455 | 11/2016 |

OTHER PUBLICATIONS

European Search Report for European Application No. 18170453.7, dated Jul. 8, 2018, 8 pages.

(Continued)

*Primary Examiner* — Thomas B Will
*Assistant Examiner* — Joel F. Mitchell
(74) *Attorney, Agent, or Firm* — Rebecca L. Henkel; Richard K. DeMille

(57) ABSTRACT

In one aspect, a shank assembly for an agricultural implement may include a shank and a biasing element configured to exert a biasing force on the shank. The shank assembly may also include a reversible mounting plate defining a mounting aperture offset from a centerline of the reversible mounting plate such that a position of a second mounting location of the biasing element relative to a first mounting location of the biasing element differs depending on whether the reversible mounting plate is provided in a first orientation relative to the biasing element or a second orientation relative to the biasing element. The biasing element may exert a first biasing force on the shank when the reversible member is oriented in the first orientation and a second, different biasing force on the shank when the reversible member is oriented in the second orientation.

20 Claims, 8 Drawing Sheets

(56) References Cited

U.S. PATENT DOCUMENTS

| | | | | |
|---|---|---|---|---|
| 3,098,529 A | * | 7/1963 | Wade et al. | A01B 35/24 172/265 |
| 3,258,076 A | | 6/1966 | Groenke | |
| 3,289,773 A | | 12/1966 | Moe | |
| 3,415,326 A | * | 12/1968 | Cafferty et al. | A01B 61/046 172/269 |
| 3,461,973 A | * | 8/1969 | Geurts | A01B 61/046 172/264 |
| 3,480,086 A | | 11/1969 | Groenke | |
| 3,529,673 A | | 9/1970 | Morris | |
| 3,642,074 A | * | 2/1972 | Geurts | A01B 61/046 172/260.5 |
| 3,700,038 A | | 10/1972 | Essex | |
| 3,700,039 A | | 10/1972 | Essex et al. | |
| 3,972,374 A | | 8/1976 | Venable et al. | |
| 4,011,916 A | | 3/1977 | Neal et al. | |
| 4,078,615 A | | 3/1978 | Kelley | |
| 4,177,865 A | * | 12/1979 | Lewison | A01B 35/24 172/705 |
| 4,200,157 A | | 4/1980 | Anderson | |
| 4,210,210 A | * | 7/1980 | Ankenman | A01B 35/22 172/272 |
| 4,249,615 A | | 2/1981 | Friggstad | |
| 4,261,423 A | | 4/1981 | Williamson | |
| 4,281,719 A | | 8/1981 | Hake et al. | |
| 4,312,408 A | | 1/1982 | Hansen | |
| 4,461,358 A | | 7/1984 | Lewison | |
| 4,463,813 A | | 7/1984 | Long et al. | |
| 4,520,878 A | | 6/1985 | Smith et al. | |
| 4,530,406 A | | 7/1985 | Hake et al. | |
| 4,548,277 A | | 10/1985 | Dietrich, Sr. et al. | |
| 4,700,785 A | | 10/1987 | Bartusek et al. | |
| 5,427,183 A | | 6/1995 | Parker | |
| 5,461,995 A | | 10/1995 | Winterton | |
| 5,465,796 A | | 11/1995 | Buescher et al. | |
| 5,787,992 A | | 8/1998 | Dobson et al. | |
| 6,250,397 B1 | | 6/2001 | Hook et al. | |
| 6,564,728 B2 | | 5/2003 | Ryan et al. | |
| 6,830,256 B2 | * | 12/2004 | Bryant | B60G 15/06 267/194 |
| 7,171,770 B2 | | 2/2007 | Schultz et al. | |
| 7,263,789 B2 | | 11/2007 | Hollinrake et al. | |
| 2003/0205392 A1 | | 11/2003 | Ruckle et al. | |
| 2008/0264653 A1 | | 10/2008 | Tiessen et al. | |
| 2013/0269960 A1 | | 10/2013 | Baker | |
| 2014/0262375 A1 | | 9/2014 | Morris et al. | |
| 2014/0338935 A1 | | 11/2014 | Kimball et al. | |

OTHER PUBLICATIONS

Salford Tillage May 2, 2017 (24 pages) http://www.paulwilkinstractors.co.nz/uploads/2/2/1/6/22168946/_salford_tillage_brochure.pdf.

Empire Tractor May 2, 2017 (2 pages) http://www.empiretractor.com/2016-case-ih-nutri-placer-930-425-ft-inventory.htm?id=23652417.

Summers Tillage May 2, 2017 (26 pages) http://summersmfg.com/media/2380/tillage_brochure.pdf.

* cited by examiner

SHANK ASSEMBLY FOR AN AGRICULTURAL IMPLEMENT WITH ADJUSTABLE BIASING FORCES AND RELATED METHODS

FIELD

The present disclosure generally relates to agricultural implements and, more particularly, to shank assemblies with adjustable or selectable biasing forces for use with agricultural implements and related methods.

BACKGROUND

It is well known that, to attain the best agricultural performance from a field, a farmer must cultivate the soil, typically through a tillage operation. Modern farmers perform tillage operations by pulling a tillage implement behind an agricultural work vehicle, such as a tractor. Tillage implements typically include a plurality of shank assemblies. Each shank assembly may include a shank pivotably coupled to a frame of the tillage implement and configured to penetrate the soil to a particular depth. Tillage implements may also include biasing elements, such as springs, configured to exert biasing forces on the shanks. This configuration may allow the shanks to maintain the particular depth of soil penetration as the agricultural work vehicle pulls the tillage implement through the field. Additionally, this configuration may also permit the shanks to pivot out of the way of rocks or other impediments in the soil, thereby preventing damage to the shank assemblies or other components on the implement.

Each biasing element generally exerts a specific predetermined biasing force on the shank of the corresponding shank assembly. In this respect, the shank may pivot relative to the frame when the soil or impediments therein exert forces on the shank that exceed the biasing force provided by the biasing element. However, since the biasing force provided by conventional biasing elements is not adjustable, the shank assembly is not able to accommodate changes in soil conditions, such as a change in soil type. Such changes may result in excessive pivoting or tripping of the shank or undesirable levels of penetration depth of the shank.

Accordingly, an improved shank assembly with adjustable or selectable biasing forces for use with an agricultural implement and related methods would be welcomed in the technology.

BRIEF DESCRIPTION

Aspects and advantages of the technology will be set forth in part in the following description, or may be obvious from the description, or may be learned through practice of the technology.

In one aspect, the present subject matter is directed to a shank assembly for an agricultural implement. The shank assembly may include a shank and a biasing element configured to exert a biasing force on the shank. The biasing element may be compressed between a first mounting location for the biasing element and a second mounting location for the biasing element. The shank assembly may also include a reversible mounting plate configured to be positioned relative to the biasing element in one of a first orientation or a second orientation. The reversible mounting plate may define a mounting aperture positioned at the second mounting location for the biasing element. The mounting aperture may be offset from a centerline of the reversible mounting plate such that a position of the second mounting location relative to the first mounting location differs depending on whether the reversible mounting plate is provided in the first orientation or the second orientation relative to the biasing element. The biasing element may exert a first biasing force on the shank when the reversible member is oriented in the first orientation and a second biasing force on the shank when the reversible member is oriented in the second orientation. The first biasing force may be different than the second biasing force.

In another aspect, the present subject matter is directed to an agricultural implement. The agricultural implement may include a frame and a shank configured to be pivotable relative to the frame. The agricultural element may also include a biasing element configured to exert a biasing force on the shank. The biasing element may be compressed between a first mounting location for the biasing element and a second mounting location for the biasing element. The agricultural implement may further include a reversible mounting plate configured to be positioned relative to the biasing element in one of a first orientation or a second orientation. The reversible mounting plate may define a mounting aperture positioned at the second mounting location for the biasing element. The mounting aperture may be offset from a centerline of the reversible mounting plate such that a position of the second mounting location relative to the first mounting location differs depending on whether the reversible mounting plate is provided in the first orientation or the second orientation relative to the biasing element. The biasing element may exert a first biasing force on the shank when the reversible member is oriented in the first orientation and a second biasing force on the shank when the reversible member is oriented in the second orientation. The first biasing force may be different than the second biasing force.

In a further aspect, the present subject matter is directed to a method for adjusting a biasing force on a shank of a shank assembly configured to be provided in operative association with an agricultural implement. The shank may be pivotably coupled to a frame of the implement. The shank assembly may further include a biasing element configured to exert a biasing force on the shank. The biasing element may be compressed between a first mounting location for the biasing element and a second mounting location for the biasing element. The method may include removing a reversible mounting plate of the shank assembly that was initially oriented at a first orientation relative to the biasing element. The reversible mounting plate may define a mounting aperture positioned at the second mounting location for the biasing element. The mounting aperture may be offset from a centerline of the reversible mounting plate such that a position of the second mounting location relative to the first mounting location differs depending on whether the reversible mounting plate is provided in the first orientation or a second orientation relative to the biasing element. The biasing element may be configured to exert a first biasing force on the shank when the reversible member is oriented in the first orientation. The method may further include adjusting the orientation of the reversible mounting plate from the first orientation to the second orientation. Additionally, the method may include installing the reversible mounting plate relative to the biasing element such that the reversible mounting plate is oriented at the second orientation and the biasing element exerts a second biasing three on the shank. The second biasing force may be different than the first biasing force.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
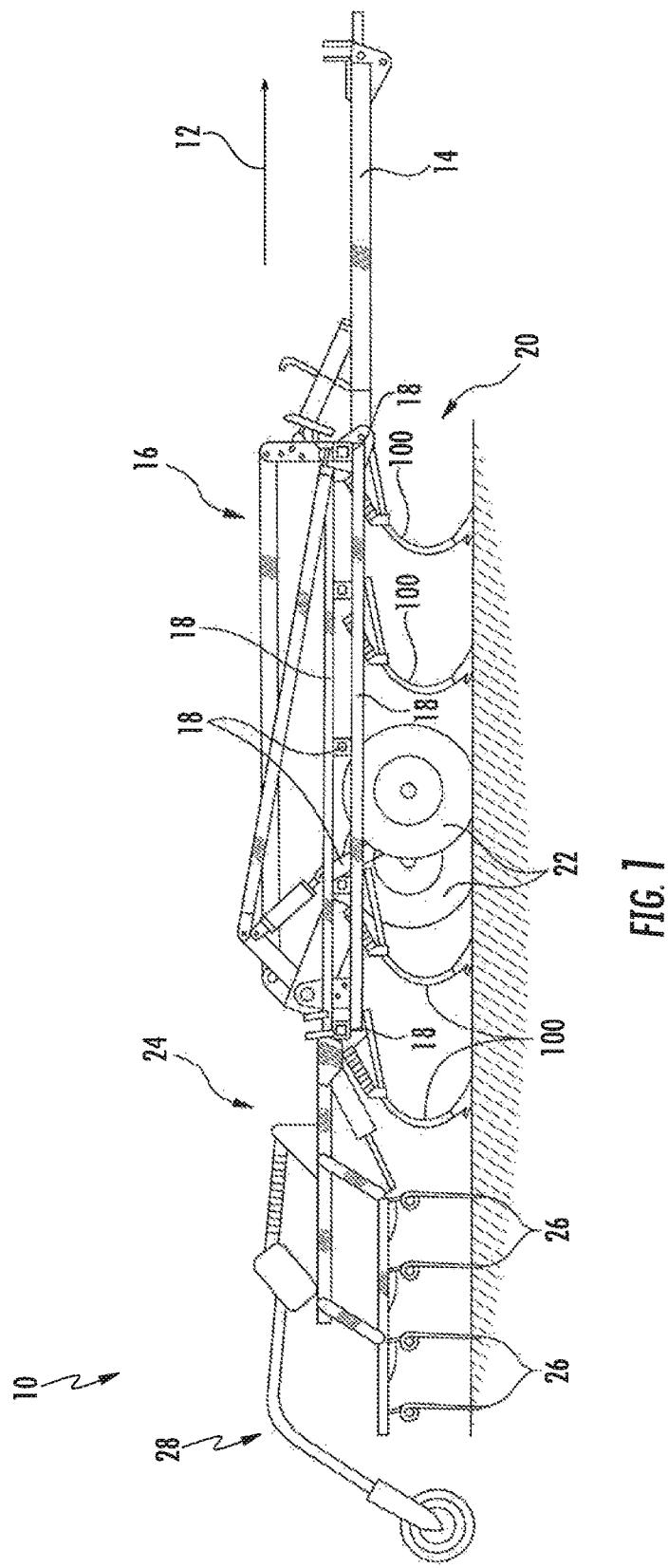
FIG. 1 illustrates a side view of one embodiment of an agricultural implement in accordance with aspects of the present subject matter.

Repeat use of reference characters in the present specification and drawings is intended to represent the same or analogous features or elements of the present technology.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a shank assembly for use with an agricultural implement and related adjustment methods. Specifically, the disclosed shank assembly may include one or more components that allow for the biasing force applied on the associated shank to be adjusted, as desired, to accommodate differing soil conditions. For example, in several embodiments, the shank assembly may include a shank and a biasing element (e.g., a spring) configured to exert a biasing force on the shank. The biasing element may be compressed between first and second mounting locations. Additionally, the shank assembly may include a reversible mounting plate positioned at one of the mounting locations for the biasing element, with the mounting plate being reversible so as to be positioned in either a first orientation or a second orientation relative to the biasing element. As will be described below, a mounting aperture of the reversible mounting plate may be offset from an associated centerline of the plate. In this respect, the relative position of the mounting locations for the biasing element may differ depending on whether the reversible mounting plate is installed at the first orientation or the second orientation relative to the biasing element. That is, the mounting locations may be spaced apart from one another by a first distance when the reversible mounting plate is installed at the first orientation; whereas, the mounting locations may be spaced apart from one another by a different, second distance when the reversible mounting plate is installed at the second orientation. As a result, by adjusting the orientation of the mounting plate relative to the biasing element between the first and second orientations, the active length of the biasing element (e.g., the compressed length of the spring) may be varied. As such, the biasing element may be configured to may exert one biasing force on the shank when the reversible member is oriented in the first orientation and a different biasing force on the shank when the reversible member is oriented in the second orientation.

Referring now to FIG. 1, a side view of one embodiment of an agricultural implement 10 is illustrated in accordance with aspects of the present subject matter. As shown, the implement 10 may be configured to be towed along a direction of travel 12 by a work vehicle (not shown), such as a tractor or other agricultural work vehicle. For example, the work vehicle may be coupled to the implement 10 via a hitch assembly 14 or using any other suitable attachments means. As shown, the hitch assembly 14 may be coupled to a frame 16 of the implement 10 to facilitate towing the implement 10 in the direction of travel 12.

The implement 10 may include the implement frame 16. As shown, the frame 16 generally includes a plurality of structural frame members 18, such as beams, bars, and/or the like, configured to support or couple to a plurality of components. For example, in one embodiment, the frame 16 may be configured to support a cultivator 20, which may be configured to till or otherwise break the soil over which the implement 10 travels to create a seedbed. In this respect, the cultivator 20 may include a plurality of shank assemblies 100, which are pulled through the soil as the implement 10 moves across the field in the direction of travel 14. Additionally, a pair of wheels 22 may be coupled to the implement frame 16 that support the weight of the frame 16 and the cultivator 20, thereby enabling the implement 10 to be towed across the field.

Additionally, as shown in FIG. 1, the implement 10 may also include a harrow 24. As is generally understood, the harrow 24 may be configured to he pivotally coupled to the frame 16. The harrow 24 may include a plurality of ground engaging elements 26, such as tines or spikes, which are configured to level or otherwise flatten any windows or ridges in the soil created by the cultivator 20. Specifically, the ground engaging elements 26 may be configured to be pulled through the soil as the implement 10 moves across the field in the direction of travel 12. It should be appreciated that the implement 10 may include any suitable number of harrows 24. In fact, some embodiments of the implement 10 may not include any harrows 24.

Moreover, in one embodiment, the implement 10 may optionally include a basket or rotary firming wheel 28. As is generally understood, the basket 28 may be configured to reduce the number of clods in the soil and/or firm the soil over which the implement 10 travels. As shown, the basket 28 may be configured to be pivotally coupled to the harrows 24. Alternately, the basket 28 may be configured to he pivotably coupled to the frame 16 or any other suitable location of the implement 10. It should be appreciated that the implement 10 may include any suitable number of baskets 28. In fact, some embodiments of the implement 10 may not include any baskets 28.

It should be appreciated that the configuration of the implement 10 described above and shown in FIG. 1 is provided only to place the present subject matter in an exemplary field of use. Thus, it should be appreciated that the present subject matter may be readily adaptable to any manner of implement configuration.

Figure 2:
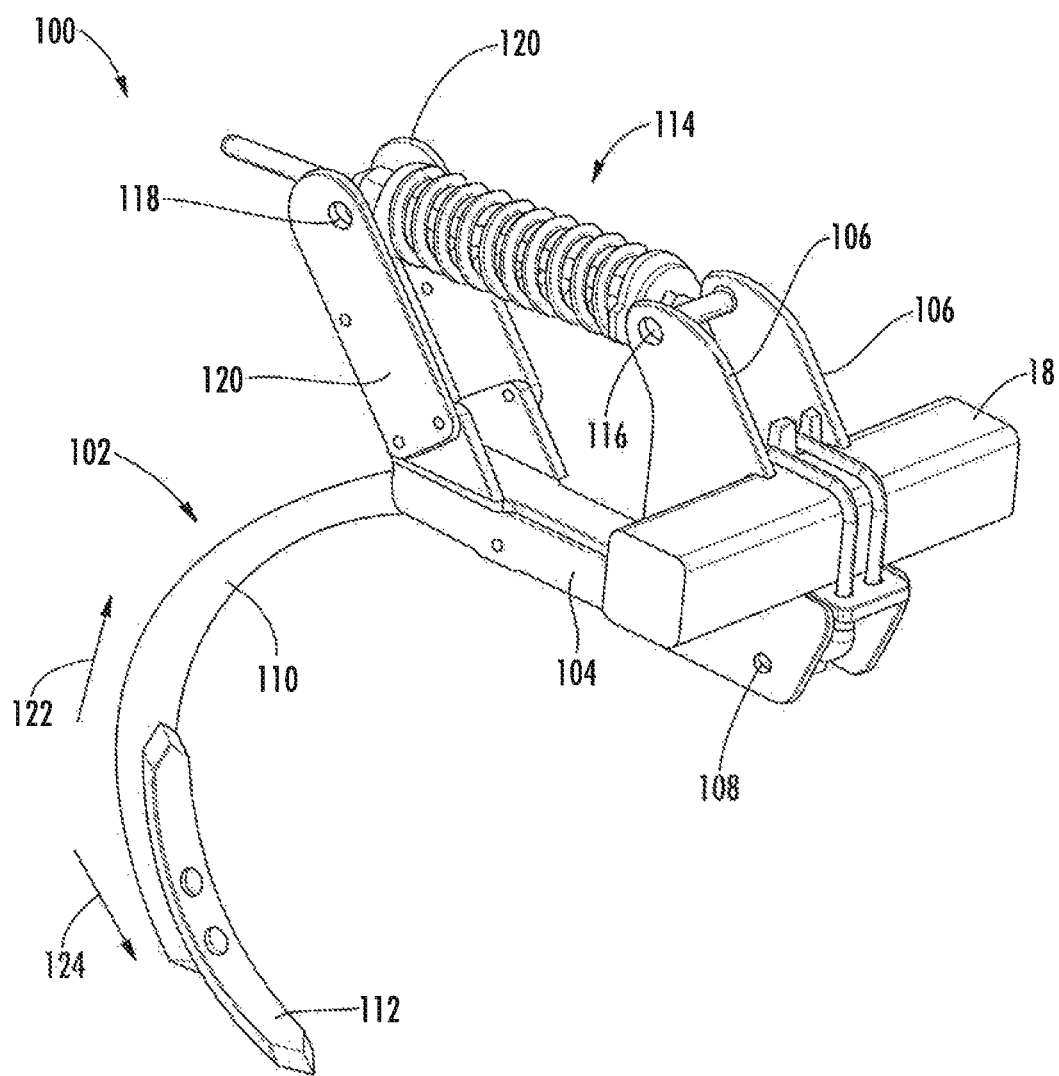
FIG. 2 illustrates a perspective view of one embodiment of a shank assembly in accordance with aspects of the present subject matter, particularly illustrating the shank assembly including a reversible mounting plate for adjusting a biasing three on a shank.

Referring now to FIG. 2, a perspective view of one embodiment of a shank assembly 100 for use with an agricultural implement is illustrated in accordance with aspects of the present subject matter. In general, the shank assembly 100 will be described herein with reference to the implement 10 described above with reference to FIG. 1. However, it should be appreciated by those of ordinary skill in the art that the disclosed shank assembly 100 may generally be utilized with implements having any other suitable implement configuration.

As shown in FIG. 2, the shank assembly 100 may include a shank 102 configured to be pivotable relative to the frame 16. In general, the shank 102 may pivot out of the way of rocks or other impediments in the soil to prevent damage to the shank 102 or other components of the shank assembly 100. As shown, in one embodiment, the shank 102 may generally include a base portion 104 pivotably coupled to frame mounting plates 106, such as at a pivot point 108. The frame mounting plates 106 may, in turn, be configured to be coupled to one of the frame members 18 of the frame 16. Although FIG. 2 shows two frame mounting plates 106 spaced apart from each other, it should be appreciated that the shank assembly 100 may include any suitable number or arrangement of frame mounting plates 106. Alternatively, the shank 102 may be pivotably coupled directly to one of the frame members 18. Additionally, the shank 102 may include a ground-engaging portion 110 extending from the base portion 104 along a curved or arcuate profile. The ground-engaging portion 110 may, in turn, include a tip end 112 that is configured to penetrate into or otherwise engage the ground as the implement 10 is being pulled through a field. In one embodiment, the ground engaging portion 110 may be configured as or include a chisel. However, one of ordinary skill in the art would appreciate that the ground engaging portion 110 may be configured as or include a sweep, tine, or any other suitable ground engaging tool.

The shank assembly 100 may also include a biasing element 114, such as one or more springs, compressed between a first mounting location 116 and a second mounting location 118. In general, the biasing element 114 is configured to exert a biasing force on the shank 102. As illustrated in FIG. 2., in one embodiment, the first mounting location 116 for the biasing element 114 may be defined by a portion of the frame mounting plates 106, such as via aligned apertures configured to receive a mounting pin or other suitable component provided in operative association with the adjacent end of the biasing element 114. Alternatively, the first mounting location 116 for the biasing element 114 may be defined by one of the frame members 18 or another component of the frame 16. Moreover, as will be discussed, the second mounting location 118 for the biasing element 114 may be defined by one or more reversible mounting plates 120 of the disclosed shank assembly 100. As shown in FIG. 2, the biasing element 114 may be configured as one or more springs. However, it should be appreciated that the biasing element 114 may be configured as any other suitable biasing element.

In several embodiments, the biasing element 114 may be configured to exert a biasing force on the shank 102 to bias the shank 102 to a predetermined shank position (e.g., a home or base position) relative to the frame 16. In general, the predetermined shank position may correspond to a shank position in which the shank 102 penetrates the soil to a desired depth. In operation, the biasing element 114 may permit relative movement between the shank 102 and the frame 16. For example, the biasing element 114 may be configured to bias the shank 102 to pivot relative to the frame 16 in a first pivot direction (e.g., as indicated by arrow 124 in FIG. 2) until the shank 102 reaches the predetermined shank position. The biasing element 114 may also allow the shank 102 to pivot away from the predetermined shank position (e.g., to a shallower depth of penetration), such as in a second pivot direction (e.g., as indicated by arrow 122 in FIG. 2) opposite the first pivot direction 124, when encountering rocks or other impediments in the field.

Additionally, as indicated above, the shank assembly 100 may include one or more reversible mounting plates 120 configured to define the second mounting location 118 for the biasing element 114 such that the biasing element 114 is supported or compressed between the first and second mounting locations 116, 118 (e.g., between the frame mounting plates 106 and the reversible mounting plates 120). In general, the reversible mounting plates 120 may be configured to be installed or positioned relative to the biasing element 114 in one of a first orientation or a second orientation. As will be discussed, reversing the orientation of the reversible mounting plates 120 from the first orientation to the second orientation may change the biasing force that the biasing element 114 exerts on the shank 102. As shown in FIG. 2, in one embodiment, the reversible mounting plates 120 may be coupled to a portion of the shank 102, such as the base portion 104, and extend upwardly therefrom towards the second mounting location 118 for the biasing element 118. Although FIG. 2 illustrates two reversible mounting plates 120 spaced apart from each other, a person of ordinary skill in the art would appreciate that the shank assembly 100 may include any suitable number of reversible mounting plates 120.

Figure 3:
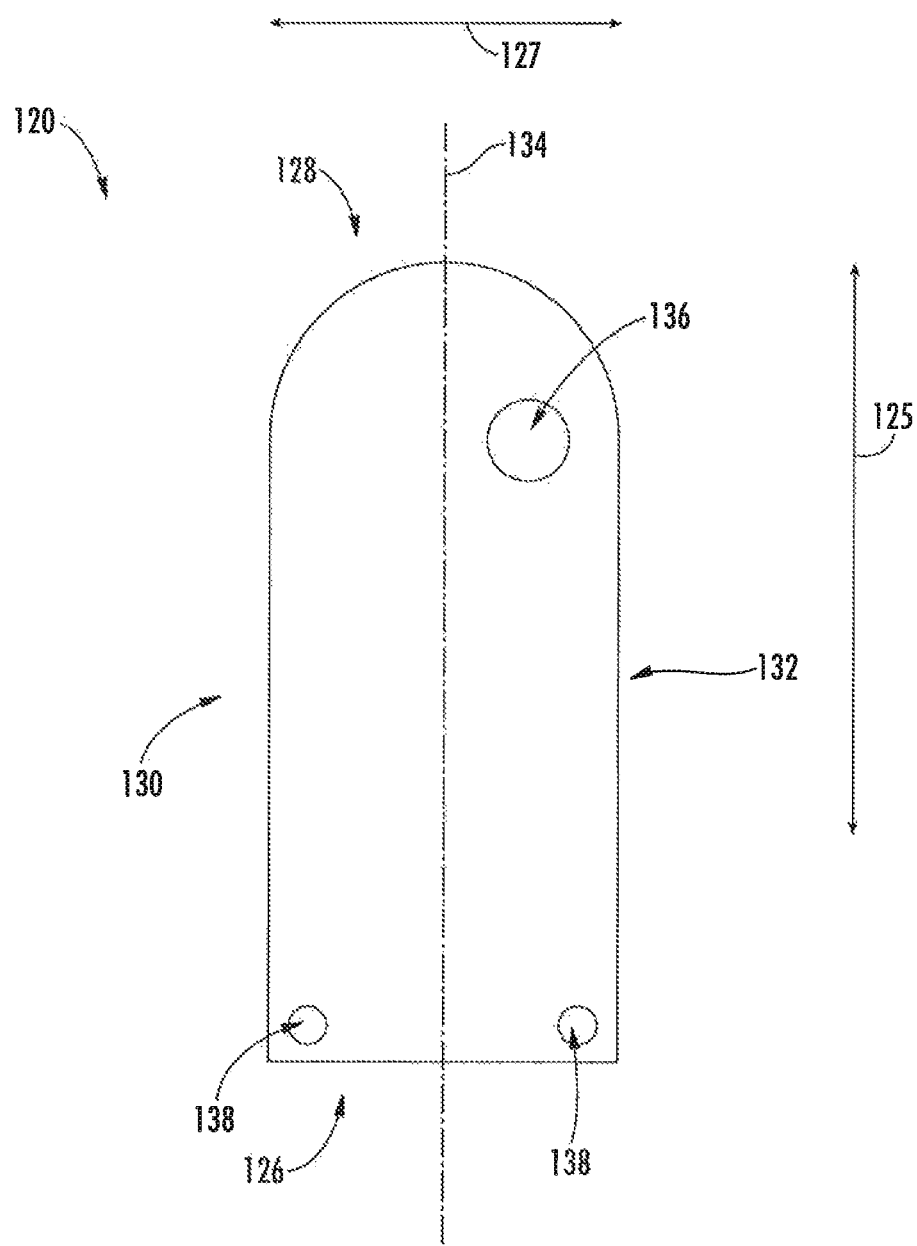
FIG. 3 illustrates a side view of one embodiment of a reversible mounting plate in accordance with aspects of the present subject matter, particularly illustrating the reversible mounting plate defining a mounting aperture offset from a centerline of the reversible, mounting plate.

Referring now to FIG. 3, a side view of one of the reversible mounting plates 120 shown in FIG. 2 is illustrated in accordance with aspects of the present subject matter. As shown, the reversible mounting plate 120 may extend in a lengthwise direction (e.g., as indicated by arrow 125 in FIG. 3) between a forward or first end 126 and an aft or second end 128. The reversible mounting plate may also extend in a lateral direction (e.g., as indicated by arrow 127 in FIG. 3) between a first side 130 and a second side 132. In this respect, the reversible mounting plate 120 may define a centerline 134 extending in the lengthwise direction 125 between the first and second ends 126, 128 of the plate 120 and positioned laterally between and equidistant from the first and second sides 130, 132. Additionally, in several embodiments, the reversible mounting plate 120 may also define a mounting aperture 136 positioned proximate to the second end 128 and offset or otherwise spaced apart from the centerline 134. As will be discussed, the mounting aperture 136 may define the second mounting location 118 for the biasing element 114. Additionally, in one embodiment, the reversible mounting plate 120 may define one or more apertures 138 positioned proximate to its first end 126 for use in coupling the reversible mounting plate 120 to the shank 102.

Figure 4:
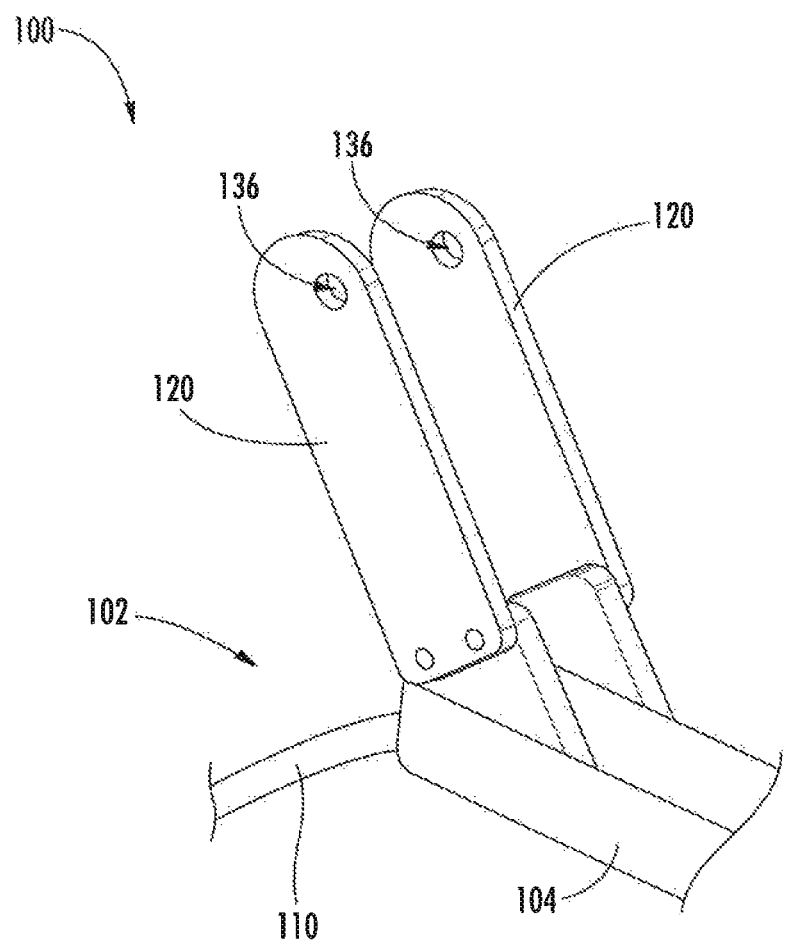
FIG. 4 illustrates a partial perspective view the shank assembly shown in FIG. 2 in accordance with aspects of the present subject matter, particularly illustrating a pair of reversible mounting plates defining a pair mounting apertures that are aligned with each other.

FIG. 4 illustrates a partial perspective of the shank assembly 100 shown in FIG. 2 in accordance with aspects of the present subject matter. Specifically, as indicated above, the shank assembly 100 may include two reversible mounting plates 120 spaced apart from each other. In one embodiment, each reversible plate 120 may define an associated mounting plate aperture 136 that is offset from an associated centerline 134. As shown, the mounting plate apertures 136 defined by each plate 120 are aligned so as to be configured to receive a mounting pin or other suitable component provided in operative association with the adjacent end of the biasing element 114.

Figure 5:
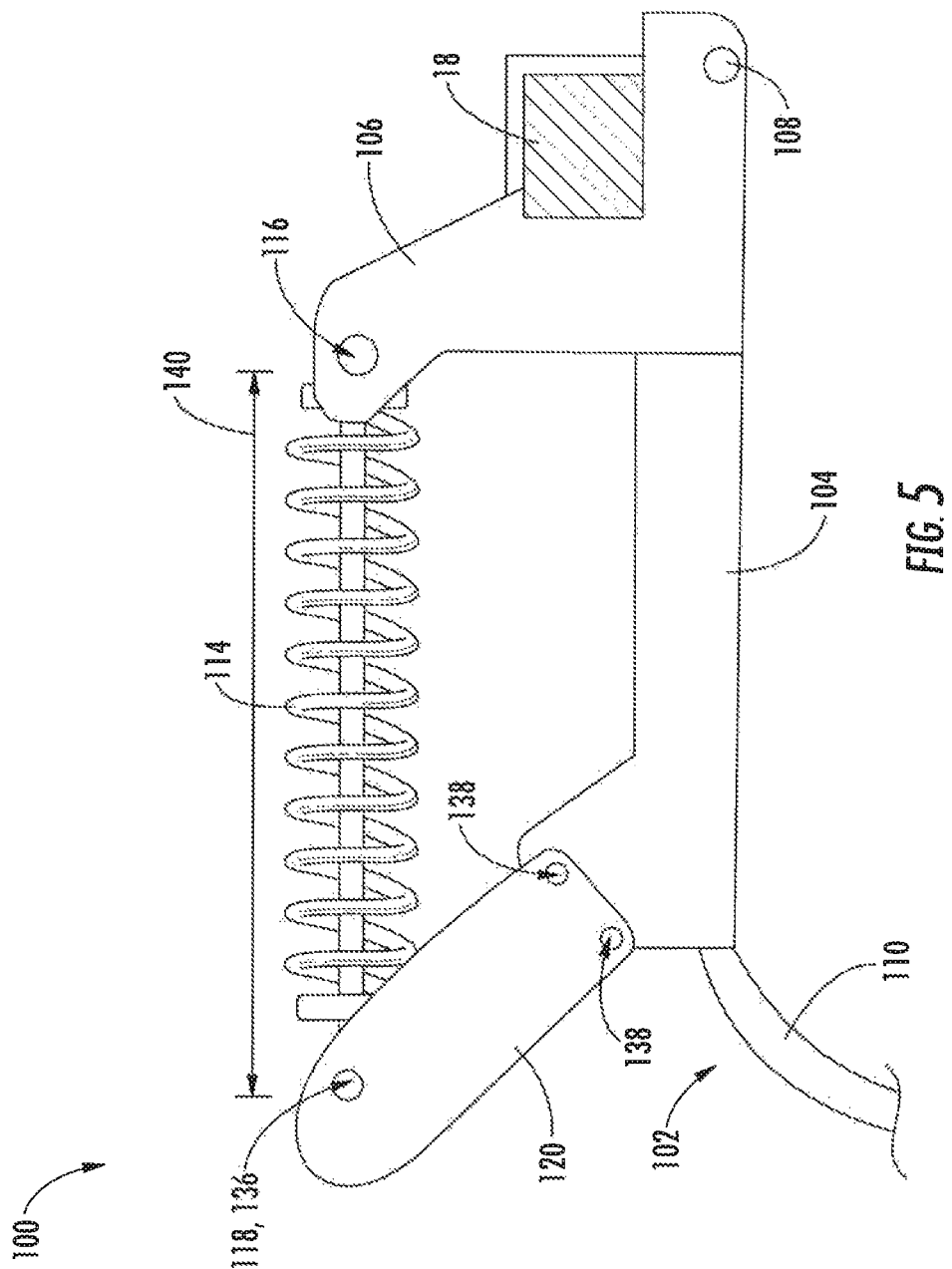
FIG. 5 illustrates a side view of one embodiment of a shank assembly in accordance with aspects of the present subject matter, particularly illustrating a biasing element defining a first compressed length when the associated reversible mounting plate is oriented at a first orientation relative to the biasing element.
Figure 6:
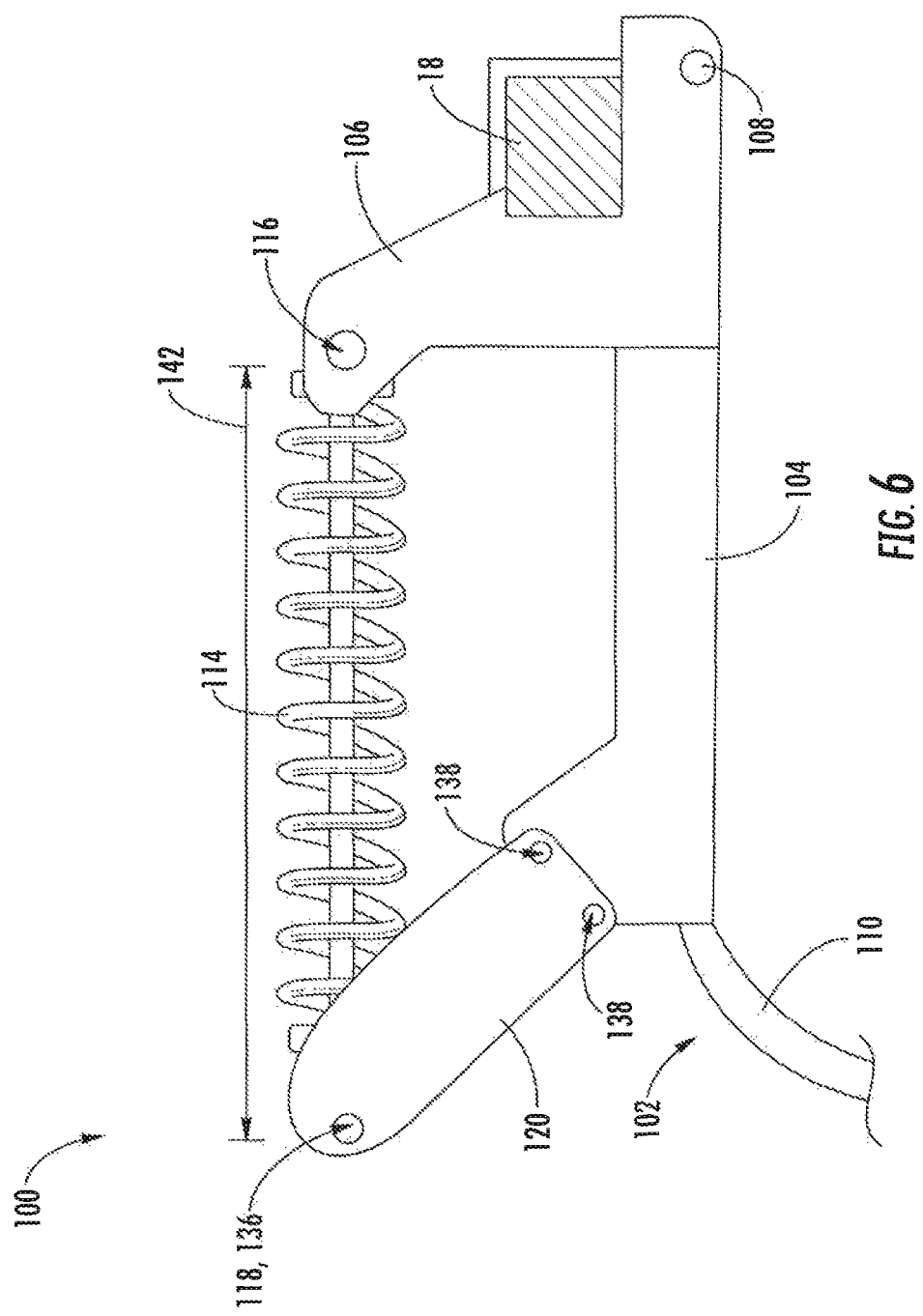
FIG. 6 illustrates another side view of the shank assembly shown in FIG. 5, particularly illustrating the biasing element defining a second compressed length after the reversible mounting plate has been installed relative to the biasing element at a second orientation that differs from the first orientation.

FIGS. 5 and 6 respectively illustrate an embodiment of the disclosed shank assembly 100 when the reversible mounting plates 120 are installed relative to the biasing element 114 in the first and second orientations. More specifically, as indicated above, each reversible mounting plate 120 defines a mounting aperture 136 that is laterally offset from the centerline 134 of such plate 120. In this respect, the position of the second mounting location 118 (e.g., as defined at the aligned mounting apertures 136 of the mounting plates 120) relative to the first mounting location 116 may change when the orientation of the mounting plates 120 are reversed (e.g., rotated one hundred and eighty degrees about the centerline 134). As such, the distance between the first and second mounting locations 116, 118 may differ depending on whether the reversible mounting plate 120 are installed at the first orientation or the second orientation relative to the biasing element 114.

For example, a first distance (e.g., as indicated by arrow 140 in FIG. 5) may be defined between the first and second mounting locations 116, 118 when the reversible mounting plates 120 are installed relative to the biasing element 114 at in the first orientation. Conversely, a second distance (e.g., as indicated by arrow 142 in FIG. 6) may be defined between the first and second mounting locations 116, 118 when the reversible mounting plates 120 are installed relative to the biasing element 114 at the second orientation. As shown in FIGS. 5 and 6, given the configuration of the mounting plates 120, the first distance 140 is less than the second distance 142. As should be appreciated, changing the distance between the first and second mounting locations 116, 118 varies the compressed length of the biasing element 114, which, in turn, may adjusts the biasing three that the biasing element 114 exerts on the shank 102. For example, in one embodiment, the biasing element 114 exerts a first biasing force on the shank 102 when the reversible mounting plates 120 are installed at the first orientation (e.g., as shown in FIG. 5) and a second biasing force on the shank 102 when the reversible mounting plates 120 are installed at the second orientation (e.g., as shown in FIG. 6). For example, given the configuration of the mounting plates 120 shown in FIGS. 5 and 6, the first biasing force is greater than the second biasing force. Thus, if a greater down force is desired on the shank 102, the mounting plates 120 may installed at the first orientation relative to the biasing element 114. In contrast, if a reduced down force is desired, the mounting plates may be installed at the second orientation relative to the biasing element 114.

Figure 7:
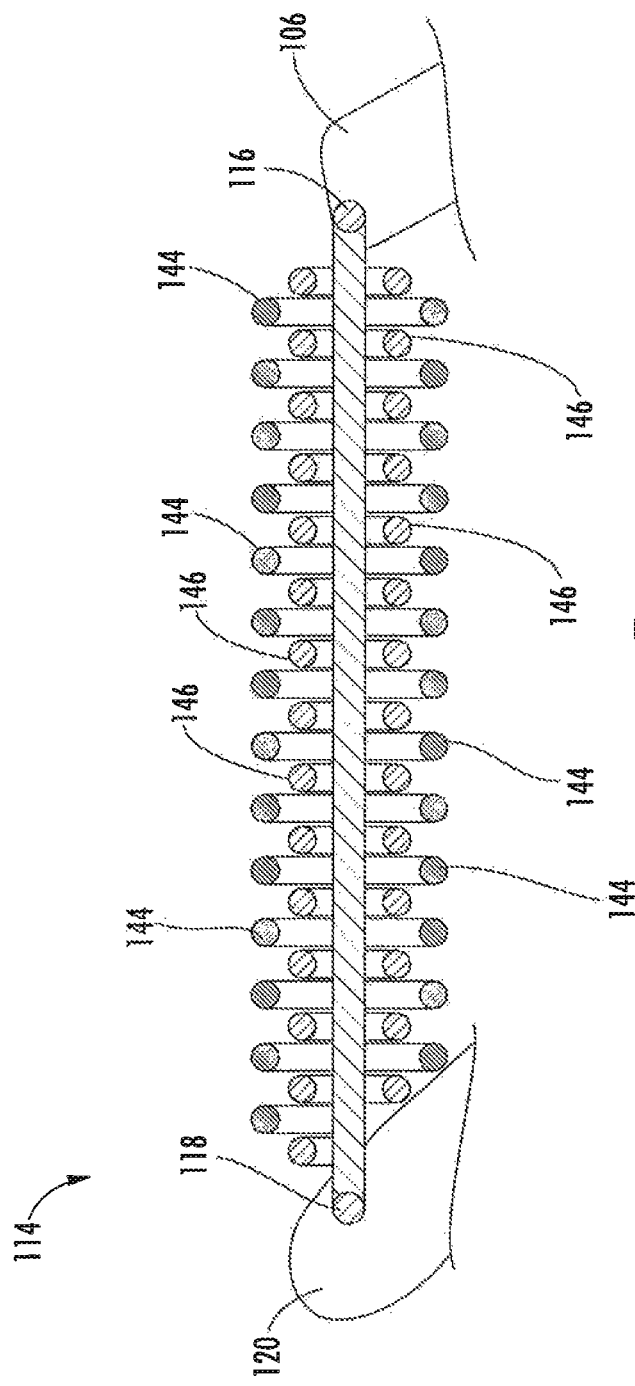
FIG. 7 illustrates a cross-sectional view of one embodiment of biasing elements suitable for use with the disclosed shank assembly in accordance with aspects of the present subject matter, particularly illustrating a first spring and a second spring positioned concentrically within the first spring.

Referring now to FIG. 7, a cross-sectional, partial view of one embodiment of the disclosed shank assembly 100 is illustrated in accordance with aspects of the present subject matter, particularly illustrating the shank assembly 100 including a pair of concentric biasing elements 144, 146 compressed between the first and second mounting locations 116, 118 defined by the opposed mounting plates 106, 120. Specifically, as shown, the shank assembly 100 include a first outer spring 144 and a second inner spring 146 positioned concentrically within the first spring 144. In several embodiments, the first and second springs 144, 146 may have different spring constants. In this respect, the first and second springs 114, 146 may provide additional adjustability of the biasing three exerted on the shank 102. More specifically, such springs 144, 146 may be configured to be installed onto the shank assembly 100 individually or in combination to adjust the biasing force applied on the shank 102. For example, by only installing the first outer spring 144 between the first and second mounting locations 116, 118, a first biasing three may be exerted on the shank 102. Similarly, by only installing the second inner spring 146 between the first and second mounting locations 116, 118, a different, second biasing force may be exerted on the shank 102. Moreover, by installing both springs between the first and second mounting locations 116, 118 (e.g., as shown in FIG. 7), a third biasing force may be exerted on the shank 102 that differs from both the first biasing force and the second biasing three. Although the shank assembly 100 is shown as only including two concentrically aligned springs 144, 146, a person of ordinary skill in the art would appreciate that the shank assembly 100 may include a greater number of concentrically aligned springs to provide even further flexibility for adjusting the biasing force applied on the shank 102.

Figure 8:
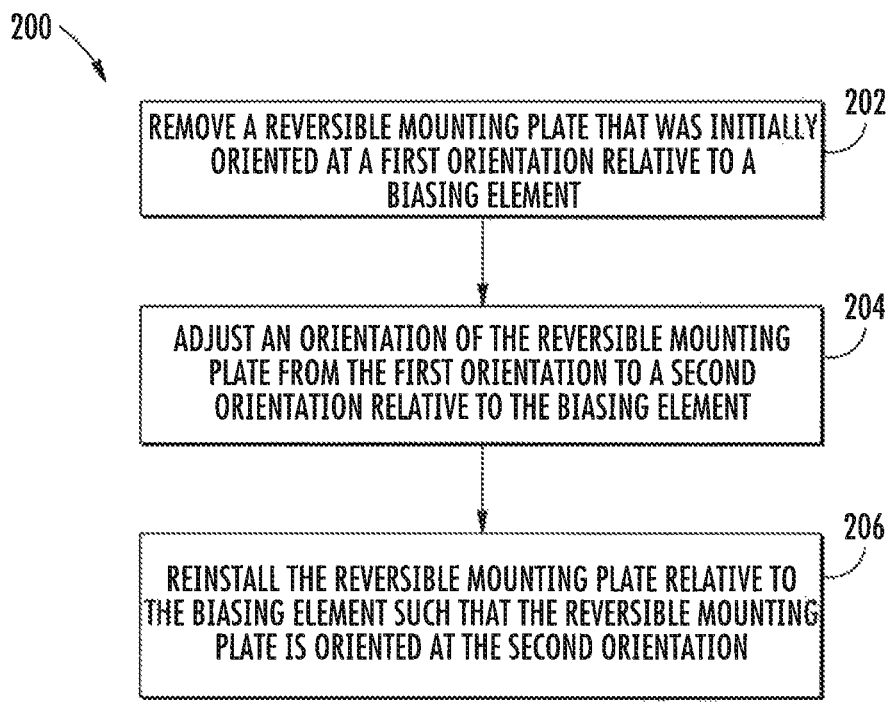
FIG. 8 illustrates a flow diagram of one embodiment of a method for adjusting a biasing force applied on a shank of an agricultural implement in accordance with aspects of the present subject matter.

Referring now to FIG. 8, a flow diagram of one embodiment of a method 200 for adjusting a biasing force exerted on a shank of an agricultural implement is illustrated in accordance with aspects of the present subject matter. In general, the method 200 will be described herein with reference to the implement 10 and the shank assemblies 100 described above with reference to FIGS. 1-7. However, it should be appreciated by those of ordinary skill in the art that the disclosed method 200 may generally be utilized to adjust a biasing force on a shank for any agricultural implement having any suitable implement configuration and/or of any shank assembly having any suitable shank assembly configuration. In addition, although FIG. 8 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 8, at (202), the method 200 may include removing a reversible mounting plate from an associated shank assembly that is initially oriented at a first orientation relative to a biasing element of a shank assembly. For instance, prior to removal, the reversible mounting plate 120 may be positioned relative to the biasing element 114 at the first orientation described above with reference to FIG. 5. In such an embodiment, given the distance 140 defined between the first and second mounting locations 116, 118 of the biasing element 114, the biasing element 114 may have been configured to exert a first biasing force on the shank 102. It should be appreciated that, in embodiments where the shank assembly 100 includes two reversible mounting plates 120, the method 200, at (202), may include removing both of the reversible mounting plates 120.

Additionally, at (204), the method 200 may include reversing an orientation of the reversible mounting plate from the first orientation to a second orientation. As described above, reversing the orientation of the reversible mounting plate 120 changes the distance between the first and second mounting locations 116, 118 for the biasing element 114, thereby changing the biasing three that the biasing element 114 exerts on the shank 102. It should be appreciated that, in embodiments where the shank assembly 100 includes two reversible mounting plates 120, the method 200, at (204), may include reversing the orientations of both of the reversible mounting plates 120.

Moreover, as shown in FIG. 8, at (206), the method 200 may include reinstalling the reversible mounting plate relative to the biasing element such that the reversible mounting plate is oriented at the second orientation and the biasing element exerts a second biasing force on the shank. For instance, after reinstallation, the reversible mounting plate 120 may be positioned relative to the biasing element 114 at the second orientation described above with reference to FIG. 6. In such an embodiment, given the distance 142 defined between the first and second mounting locations 116, 118 of the biasing element 114, the biasing element 114 may exert a second biasing force on the shank 102 that differs from the original first biasing force. It should be appreciated that, in embodiments where the shank assembly 100 includes two reversible mounting plates 120, the method 200, at (206), may include reinstalling both of the reversible mounting plates 120 relative to the biasing element 114.

Furthermore, in several embodiments, the method 200 may also include compressing or installing one or more biasing elements (e.g., springs) between the first and second mounting locations. For instance, as described above with reference to FIG. 7, a first spring 144 and/or a second spring 146 may be compressed or installed between the first and second mounting locations 116, 118 of the biasing element 114. As described above, when installing both springs 144, 146 between the mounting locations 116, 118, the second spring 146 may be positioned concentrically within the first spring 144.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the lateral language of the claims.

What is claimed is:

1. A shank assembly for an agricultural implement, the shank assembly comprising:
   a shank;
   a biasing element configured to exert a biasing force on the shank, the biasing element being compressed between a first mounting location for the biasing element and a second mounting location for the biasing element;
   a reversible mounting plate configured to be positioned relative to the biasing element in both a first orientation and a second orientation, the second orientation for the reversible mounting plate being offset from the first orientation by one hundred and eighty degrees about a centerline of the reversible mounting plate, the reversible mounting plate defining a mounting aperture positioned at the second mounting location for the biasing element, the mounting aperture being offset from the centerline of the reversible mounting plate such that a position of the second mounting location relative to the first mounting location differs depending on whether the reversible mounting plate is provided in the first orientation or the second orientation relative to the biasing element;
   wherein the biasing element exerts a first biasing force on the shank when the reversible member is oriented in the first orientation and a second biasing force on the shank when the reversible member is oriented in the second orientation, the first biasing force being different than the second biasing force.

2. The shank assembly of claim 1, wherein the biasing element defines a first compressed length between the first and second mounting locations when the reversible member is oriented in the first orientation and a second compressed length between the first and second mounting locations when the reversible member is oriented in the second orientation, the first compressed length being different than the second compressed length.

3. The shank assembly of claim 1, wherein the biasing element comprises a first spring.

4. The shank assembly of claim 3, further comprising a second spring positioned concentrically within the first spring.

5. The shank assembly of claim 4, wherein the first spring has a spring constant that differs from a spring constant of the second spring.

6. The shank assembly of claim 1, wherein the reversible mounting plate corresponds to a first reversible mounting plate and the mounting aperture corresponds to a first mounting aperture, further comprising a second reversible mounting plate spaced apart from the first reversible plate, the second reversible mounting plate defining a second mounting aperture configured to be aligned with the first mounting aperture at the second mounting location.

7. The shank assembly of claim 1, wherein the reversible mounting plate is coupled to a portion of the shank.

8. The shank assembly of claim 1, wherein the first mounting location is defined by at least one mounting plate configured to be coupled to a frame of the agricultural implement.

9. The shank assembly of claim 8, wherein the shank is pivotably coupled to the at least one mounting plate.

10. The shank assembly of claim 1, wherein the reversible mounting plate extends in a lengthwise direction between a first end and a second end and in a lateral direction between a first side and a second side, the centerline extending in the lengthwise direction between the first and second ends of the reversible mounting plate and being positioned laterally between the first and second sides of the reversible mounting plate.

11. An agricultural implement, comprising:
a frame;
a shank configured to be pivotable to the frame;
a biasing element configured to exert a biasing force on the shank, the biasing element being compressed between a first mounting location for the biasing element and a second mounting location for the biasing element;
a reversible mounting plate configured to be positioned relative to the biasing element in both a first orientation and a second orientation, the second orientation for the reversible mounting plate being offset from the first orientation by one hundred and eighty degrees about a centerline of the reversible mounting plate, the reversible mounting plate defining a mounting aperture positioned at the second mounting location for the biasing element, the mounting aperture being offset from the centerline of the reversible mounting plate such that a position of the second mounting location relative to the first mounting location differs depending on whether the reversible mounting plate is provided in the first orientation or the second orientation relative to the biasing element;
wherein the biasing element exerts a first biasing force on the shank when the reversible member is oriented in the first orientation and a second biasing force on the shank when the reversible member is oriented in the second orientation, the first biasing force being different than the second biasing force.

12. The agricultural implement of claim 11, wherein the biasing element defines a first compressed length between the first and second mounting locations when the reversible member is oriented in the first orientation and a second compressed length between the first and second mounting locations when the reversible member is oriented in the second orientation, the first compressed length being different than the second compressed length.

13. The agricultural implement of claim 11, wherein the biasing element comprises a first spring.

14. The agricultural implement of claim 13, further comprising a second spring positioned concentrically within the first spring.

15. The agricultural implement of claim 14, wherein the first spring has a spring constant that differs from a spring constant of the second spring.

16. The agricultural implement of claim 11, wherein the reversible mounting plate corresponds to a first reversible mounting plate and the mounting aperture corresponds to a first mounting aperture, further comprising a second reversible mounting plate spaced apart from the first reversible mounting plate, the second reversible mounting plate defining a second mounting aperture configured to be aligned with the first mounting aperture at the second mounting location.

17. The agricultural implement of claim 11, wherein the reversible mounting plate is coupled to a portion of the shank.

18. The agricultural implement of claim 11, wherein the first mounting location is defined by at least one mounting plate configured to be coupled to the frame of the agricultural implement.

19. The agricultural implement of claim 18, wherein the shank is pivotably coupled to the at least one mounting plate.

20. A method for adjusting a biasing force on a shank of a shank assembly configured to be provided in operative association with an agricultural implement, the shank being pivotably coupled to a frame of the implement, the shank assembly further including a biasing element configured to exert a biasing force on the shank, the biasing element being compressed between a first mounting location for the biasing element and a second mounting location for the biasing element, the method comprising:
removing a reversible mounting plate of the shank assembly that was initially oriented at a first orientation relative to the biasing element, the reversible mounting plate defining a mounting aperture positioned at the second mounting location for the biasing element, the mounting aperture being offset from a centerline of the reversible mounting plate such that a position of the second mounting location relative to the first mounting location differs depending on whether the reversible mounting plate is provided in the first orientation or a second orientation relative to the biasing element, the biasing element configured to exert a first biasing force on the shank when the reversible member is oriented in the first orientation;
adjusting the orientation of the reversible mounting plate from the first orientation to the second orientation by rotating the reversible mounting plate one hundred and eighty degrees about the centerline of the reversible mounting plate; and
reinstalling the reversible mounting plate relative to the biasing element such that the reversible mounting plate is oriented at the second orientation and the biasing element exerts a second biasing force on the shank, the second biasing force being different than the first biasing force.

* * * * *